Jan. 21, 1964 I. C. HANSEN 3,119,095
DIODE HEAD SELECT MATRIX
Filed Jan. 2, 1962
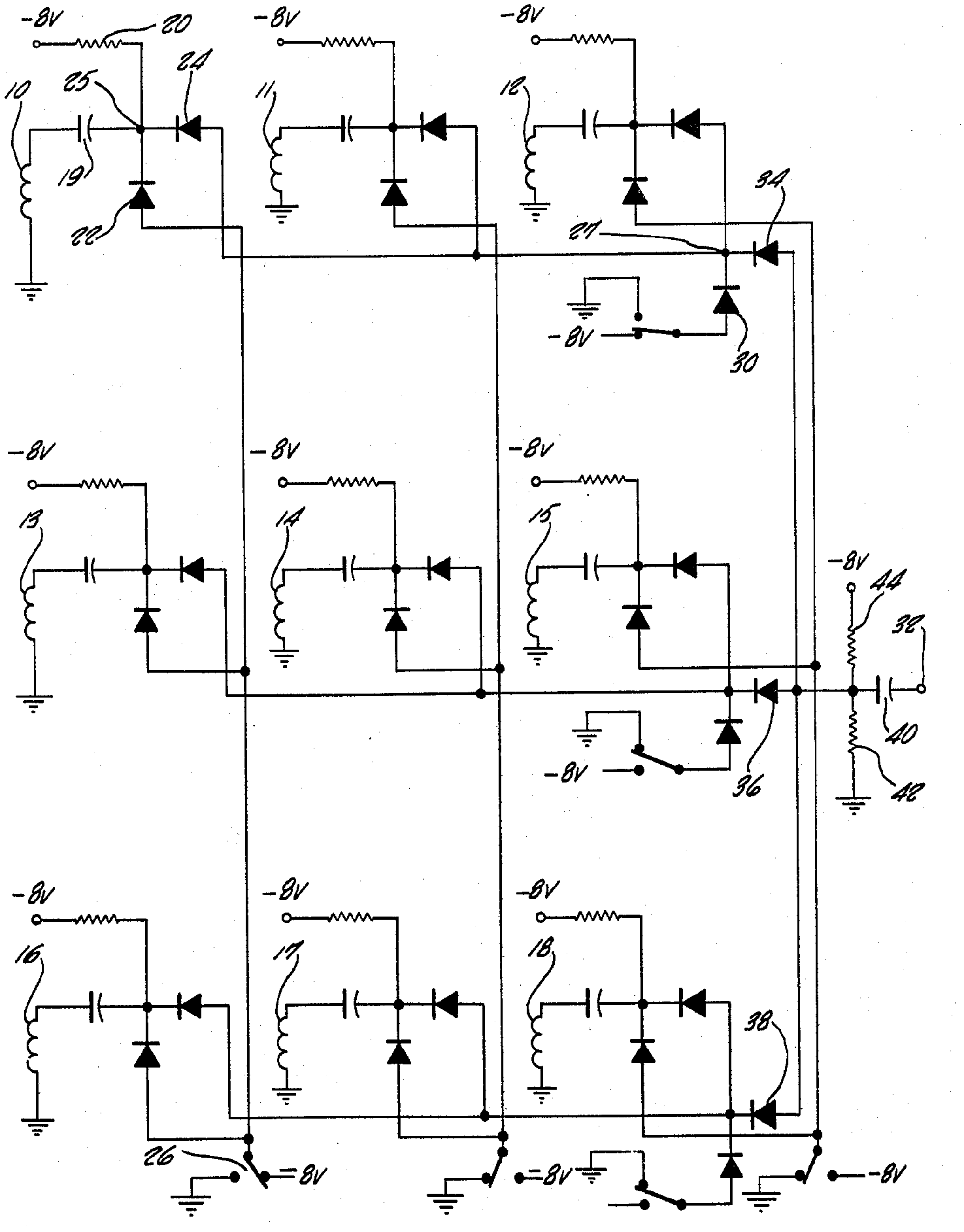
INVENTOR.
IVER C. HANSEN
BY
Christie, Parker & Hale
ATTORNEYS.

United States Patent Office 3,119,095 Patented Jan. 21, 1964

3,119,095
DIODE HEAD SELECT MATRIX

Iver C. Hansen, Montebello, Calif., assignor to Burroughs Corporation, Detroit, Mich., a corporation of Michigan Filed Jan. 2, 1962, Ser. No. 164,225
4 Claims. (Cl. 340—166)

This invention relates to diode switching circuits and, more particularly, is concerned with switching circuits for switching between magnetic tape recording heads.

In both digital and analog recording on magnetic tape, it is not unusual to have to switch an input or an output signal to any one of a number of recording heads. Various switching circuits have heretofore been proposed for accomplishing such a switching operation. For example, relays have been used, but are subject to a number of disadvantages. Because of the low level signals which are being switched, the relays must have very low noise contacts and have good shielding to prevent magnetic noise pickup and to prevent cross talk between adjacent circuits. Relays suitable for this purpose are therefore high in cost. Furthermore, the relays are bulky in size, have limited life, and provide a high maintenance problem, in addition to being relatively slow acting and taking high energy drive circuits in order to control the relays from normal switching signals.

Electronic switching circuits have been used heretofore but such known electronic circuits also have proved relatively expensive. Furthermore, known electronic switching circuits do not provide the degree of isolation between the heads to prevent cross talk between recording channels. Moreover, most electronic circuits produce direct currents in the heads, resulting in the need to demagnetize the heads periodically.

The present invention provides a matrix switching circuit for connecting any one of a number of magnetic heads to a common output for reading or a common input for writing. The present invention provides a relatively inexpensive switching matrix circuit which can be used for switching between magnetic heads both on read and write. The switching circuit can be used both for analog and digital signals. The switching matrix of the present invention provides a relatively inexpensive switching circuit which can be operated from low level switching signals without special drive circuits. Cross talk between heads is prevented by providing effectively a short in shunt with each head and an open circuit in series with all but the selected head. Complete D.C. isolation of the magnetic heads is provided. The switching matrix utilizes inexpensive logical type diodes resulting in a small package size for the matrix circuit with high reliability of operation.

In brief, the present invention provides a magnetic recording head switching circuit in which a plurality of low impedance magnetic heads are arranged in a matrix of columns and rows. Each magnetic head is connected by means of a capacitor and resistor in series across a potential source. First and second diodes associated with each head are both connected at one end to the common junction with the resistor and capacitor, the other end of the first diode associated with each head in a column being connected to a common input terminal. The other end of the second diode associated with each head in a row is connected to a common junction. The common junction associated with each row is connected by a diode to a row input terminal. A further group of diodes connects each of the common junctions associated with the various rows of the matrix with a point on a voltage divider. The circuit is arranged so that when proper potentials are applied to a particular row input and column input, a conductive path is provided only for the particular head associated with both the row and column selected through the second diode to the common point on the voltage divider.

For a more complete understanding of the invention, reference should be made to the accompanying drawing, wherein the single figure is a schematic diagram of the switching matrix circuit.

Referring to the drawing in detail, the numerals 10 through 18 indicate generally the coils of magnetic recording heads, nine of which are shown arranged in three columns and three rows of a matrix configuration. Each head is connected at one end to ground and at the other end to a negative potential source through a capacitor and resistor in series, such as the capacitor 19 and resistor 20 associated with the head 10.

Each head has associated therewith first and second diodes, indicated at 22 and 24 in the circuit associated with the head 10. The first and second diodes associated with each head have their cathodes connected to the series junction point, such as indicated at 25, between the resistor and the capacitor. The anodes of the first diodes associated with each head in a column are connected together to either a ground potential or a negative potential through switching means, such as indicated at 26 for the lefthand column. While mechanical switches have been shown associated with each column, it will be understood that flip-flops or other means for providing either one of two voltage levels to a particular column may be provided.

The second diodes associated with each head in the matrix, such as the diode 24, have their anodes connected together in rows. The common connection, such as indicated at 27 for the upper row, between the anodes of the second diodes in a particular row is connected either to ground or a negative potential through an associated switch and series diode, as indicated at 28 and 30 respectively for the upper row. The series diodes are connected to pass current in the same direction as the second diodes.

Each of the magnetic heads is connected to a terminal 32 through the second diodes, such as the second diode 24 associated with the head 10, the second diodes associated with the heads in each row being connected to the terminal 32 through a series diode. Thus the heads in the upper row are connected to the terminal 32 through a series diode 34 and each of the other rows is connected to the terminal 32 by means of series diodes 36 and 38. The anodes of the diodes 34, 36 and 38 are connected to the terminal 32 through a capacitor 40. A voltage divider including a pair of resistors 42 and 44 maintains a slightly negative potential on the anodes of the diodes 34, 36 and 38.

In operation, it is assumed that normally all of the column switches, such as the switch 26, provide a ground connection. Likewise, all of the row switches, such as the switch 28, provide a ground connection. In order to select one head for coupling to the terminal 32, one row switch and one column switch are reversed to provide a negative potential on the respective column and row inputs.

Operation of the circuit then is as follows: considering the operation of the head 10, if the column switch 26 is set to the normal grounded position and the row switch 28 likewise is set to the normal grounded position, both the first diode 22 and the second diode 24 clamp the series junction point between the capacitor 19 and resistor 20 at ground. Thus the head is effectively shorted to ground. At the same time, the diode 34 is back biased to provide a substantial open circuit to the terminal 32. The same condition applies to all the other heads.

Even if either the switch 26 or the switch 28 is set to provide a negative potential to the corresponding columns or rows of the matrix, the series junction point 25 between the capacitor 19 and resistor 20 is still clamped to ground potential and the head 10 is effectively shorted out.

However, if both the switch 26 and the switch 28 are set to provide a negative potential to the associated column and row of the matrix, the first diode 22 is back biased and the diode 30 is back biased. A current conduction path is then provided from ground through the resistor 42, the diode 34, the diode 24, the resistor 20 to the negative potential source. As a result, the series junction point 25 between the capacitor 19 and resistor 20 is clamped at a negative potential determined by the value of the resistors 42, 44 and 20, which potential may be of the order of −3 volts. The second diode 24 associated with the head 10 and the row diode 34 are now forward biased. Forward biasing of the diodes 24 and 34 provides a low impedance path between the head 10 and the terminal 32 for alternating currents generated in the head or for alternating currents supplied to the terminal 32 respectively under read and write operating conditions.

What is claimed is:

1. A magnetic recording head switching circuit comprising a plurality of low impedance magnetic heads arranged in a matrix of columns and rows, a capacitor and resistor associated with each head and connected in series with each head between ground and a potential source, first and second diodes associated with each head connected at one end to a common junction with the resistor and the capacitor, the other ends of the first diodes in each column of heads being connected to a column input terminal, the other ends of the second diodes in each row being connected to a common junction, a plurality of control diodes, one control diode being connected between a row input terminal and said common junction of the associated row, and a signal circuit including a voltage divider network and a plurality of signal coupling diodes, each signal coupling diode being connected between a common point on the voltage divider network and one of said common junctions, whereby each row of the matrix is connected by a signal coupling diode to the common point on the voltage divider network.

2. A magnetic recording head switching circuit comprising a plurality of magnetic heads arranged in a matrix of columns and rows, a capacitor and resistor associated with each head and connected in series with each head between ground and a potential source, first and second unidirectionally conductive devices associated with each head connected at one end to a common junction with the resistor and the capacitor, the other ends of the first unidirectionally conductive devices in each column of heads being connected to a column input terminal, the other ends of the second unidirectionally conductive devices in each row being connected to a common junction, a plurality of control unidirectionally conductive devices, one control unidirectionally conductive device being connected between a row input terminal and said common junction of the associated row, and a signal circuit including a voltage divider network and a plurality of signal coupling unidirectionally conductive devices, each signal coupling unidirectionally conductive device being connected between a common point on the voltage divider network and one of said common junctions, whereby each row of the matrix is connected by a signal coupling unidirectionally conductive device to the common point on the voltage divider network.

3. Apparatus as defined in claim 1 including means for selectively connecting one of two different potentials to the respective row and column input terminals.

4. A magnetic recording head switching circuit comprising a plurality of two-terminal magnetic head coils arranged in a matrix of columns and rows, a resistor and capacitor connected in series with each head across a potential source, a first diode associated with each head, means for selectively connecting all of the first diodes in any one column of heads in shunt across the respective heads or in shunt across the respective resistors, a second diodes associated with each head, means including a third diode associated with each row of heads for selectively connecting all of the second diodes in any one row of heads in shunt across the respective heads or in shunt across the respective resistors, and means including a fourth diode associated with each row of heads for connecting each of the second diodes to a potential source of smaller potential than said first-mentioned potential source.

No references cited.